(12) United States Patent
Wayne et al.

(10) Patent No.: US 8,184,209 B2
(45) Date of Patent: May 22, 2012

(54) SMART SLATE

(75) Inventors: Ian Wayne, Los Angeles, CA (US);
Edward Anderson, El Segundo, CA
(US); James Ketcham, Malibu, CA
(US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 591 days.

(21) Appl. No.: 12/403,173

(22) Filed: Mar. 12, 2009

(65) Prior Publication Data

US 2009/0231492 A1 Sep. 17, 2009

Related U.S. Application Data

(60) Provisional application No. 61/036,005, filed on Mar. 12, 2008, provisional application No. 61/036,010, filed on Mar. 12, 2008, provisional application No. 61/140,520, filed on Dec. 23, 2008.

(51) Int. Cl.
*H04N 5/222* (2006.01)
(52) U.S. Cl. ........................................ 348/722
(58) Field of Classification Search .................. 348/722, 348/725; 352/3, 4, 6, 17, 18, 22, 23, 244, 352/44, 90, 55, 40, 92, 12, 84, 236; 386/201, 386/216, 233, 241; *H04N 5/222, 5/44*
See application file for complete search history.

(56) References Cited

U.S. PATENT DOCUMENTS

| | | | |
|---|---|---|---|
| 3,528,731 A * | 9/1970 | Bird | 352/90 |
| 6,374,260 B1 | 4/2002 | Hoffert et al. | |
| 6,831,729 B1 | 12/2004 | Davies | |
| 7,200,320 B1 | 4/2007 | Denecke et al. | |
| 2006/0218183 A1 | 9/2006 | Ivey et al. | |
| 2009/0231459 A1 * | 9/2009 | Wayne et al. | 348/222.1 |

OTHER PUBLICATIONS

International Search Report and Written Opinion issued in PCT/US2009/037011 on Aug. 19, 2009.

* cited by examiner

*Primary Examiner* — Sherrie Hsia
(74) *Attorney, Agent, or Firm* — Samuel S. Lee; Procopio, Cory, Hargreaves & Savitch LLP

(57) ABSTRACT

Techniques used for movie, video, or television production, including: generating production information about recorded data of one of: (1) audio sequence; (2) video sequence; and (3) audio and video sequences; tagging the generated production information with timing information; displaying the generated production information on a display; recording the tagged production information, wherein a clapstick of a slate is used to initiate the recording automatically; and associating the tagged production information with corresponding recorded data.

21 Claims, 8 Drawing Sheets

SMART SLATE

CROSS-REFERENCE TO RELATED APPLICATIONS

This application claims the benefit of priority of U.S. Provisional Patent Application No. 61/036,005, filed Mar. 12, 2008, entitled "Smart Slate," U.S. Provisional Patent Application No. 61/036,010, filed Mar. 12, 2008, entitled "Direct Camera Dailies," and U.S. Provisional Patent Application No. 61/140,520, filed Dec. 23, 2008, entitled "Camera Event Logger." The disclosures of the above-referenced provisional applications are incorporated herein by reference.

BACKGROUND

1. Field of the Invention

The present invention relates to movie, video, or television production, and more specifically, to generating, presenting, and recording of production information about audio and video sequences during such movie, video, or television production.

2. Background

In motion picture and videotape production, a slate is commonly used to synchronize picture with sound. The slate is also used to identify and mark particular scenes and takes recorded during a production. Conventional techniques have been developed to generate and record time code during production of a film or videotape. One such technique includes a slate, which provides a display for displaying time code, and a surface for enabling handwritten entry of production-related information. Other techniques include generating and displaying video time code for recording during the video and audio portions of a film or videotape in production.

SUMMARY

In one implementation, a method for movie, video, or television production is disclosed. The method including: generating production information about recorded data of one of: (1) audio sequence; (2) video sequence; and (3) audio and video sequences; tagging the generated production information with timing information; displaying the generated production information on a display; recording the tagged production information, wherein a clapstick of a slate is used to initiate the recording automatically; and associating the tagged production information with corresponding recorded data.

In another implementation, a slate for movie, video, or television production is disclosed. The system including: a radio frequency interface configured to communicate with a timecode generator and at least one post-production processing station; a processor configured to receive and tag production information about recorded data of one of: (1) audio sequence; (2) video sequence; and (3) audio and video sequences, wherein the production information is tagged with timing information obtained from the timecode generator and a camera logging device; a display configured to display the production information; a clapstick coupled to the processor; and a recorder configured to record and associate the tagged production information with the corresponding recorded data, wherein the clapstick is used to initiate the recording.

In a further implementation, a computer-readable storage medium storing a computer file for movie, video, or television production is disclosed. The computer file including executable XML instructions that cause a computer to: generate production information about recorded data of one of: (1) audio sequence; (2) video sequence; and (3) audio and video sequences; tag the generated production information with timing information; display the generated production information on a display; record the tagged production information, wherein a clapstick of a slate is used to initiate the recording; and associate the tagged production information with the corresponding recorded data.

Other features and advantages of the present invention will become more readily apparent to those of ordinary skill in the art after reviewing the following detailed description and accompanying drawings.

DETAILED DESCRIPTION

Certain implementations as disclosed herein provide techniques for generating, presenting, and recording of production information about audio and video sequences during movie, video, or television production. In one implementation, a presentation technique comprises configuring an enhanced slate which includes a clapstick, and an enclosure housing display and a processor to display the production information such as date, timecode, director, current scene, take, roll, camera number, and other information. Further, a recording technique comprises associating the generated production information tagged with timing information as metadata to the corresponding recorded data of the audio and video sequences. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In one implementation, the enhanced slate includes computer functionality (processing, storage, input/output) to provide easier presentation and recording of a variety of information during movie, video, or television production. The enhanced slate also includes a clapstick and a display. The clapstick is used to initiate a file writing process for writing production information, which is time-stamped with timecode. When the enhanced slate is "clapped" in a traditional manner, it writes the production information into a formatted file (e.g., extensible markup language (XML) file that can be imported into Apple's Final Cut Pro editing systems). In one example implementation, an application that converts film or tape transfer logs uses an Avid .ALE format which is the format of the ASCII (text file) that can be imported into Avid editing systems. The slate typically needs to generate, at minimum, one XML, ALE file per production day.

Further, the display is configured to show production information such as date, timecode, director, scene, take, roll, camera number, and other information related to movie, video, or television production. For example, one implementation of an enhanced slate includes a touch-screen monitor and accepts information written thereon with a stylus (e.g., director name, scene number) and automatically records input information tagged with timing information to create metadata files. These metadata files can then be transferred (e.g., by memory card or wirelessly) to a computer and then associated with the corresponding recorded audio and/or video data (e.g., using timecode).

Figure 1:
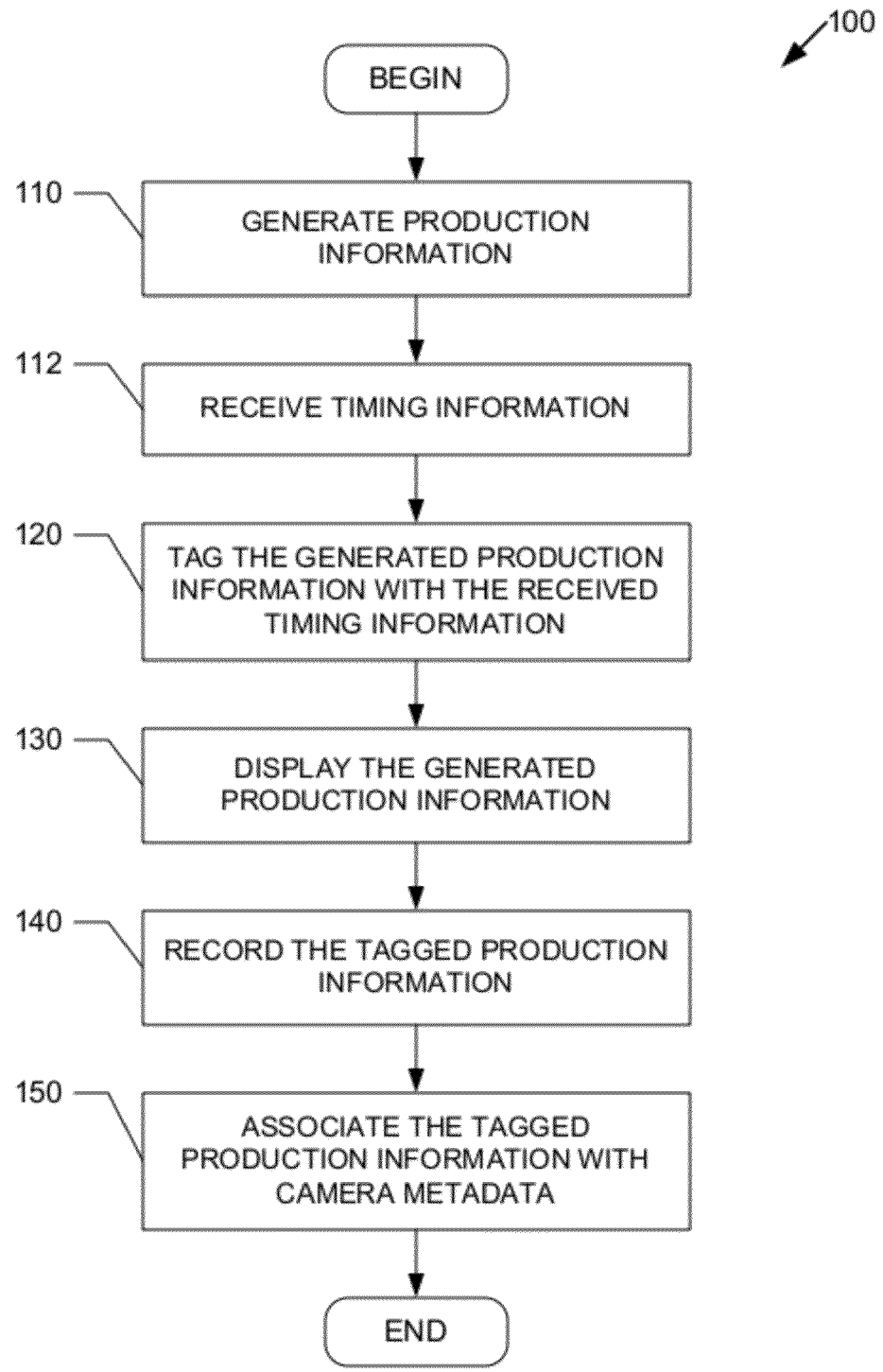
FIG. 1 is a flowchart illustrating a process for generating, presenting, and recording of production information about audio and video sequences during movie, video, or television production.

FIG. 1 is a flowchart 100 illustrating a process for generating, presenting, and recording of production information about audio or video sequence during movie, video, or television production. Production information about at least one of audio and video sequences is generated, at box 110. As discussed above, the production information, such as director name or current scene number, can be received from an input/output device. Thus, it should be noted that the term "generating" includes the term "receiving" as used herein. Timing information is then received, at box 112, typically from a timecode generator (see FIG. 8). The generated production information is tagged with the timing information, at box 120, and the generated production information is displayed, at box 130. In one implementation, a processor is configured to display the production information such as date, timecode, director, current scene, take, roll, camera number, and other information on a display.

Figure 2:
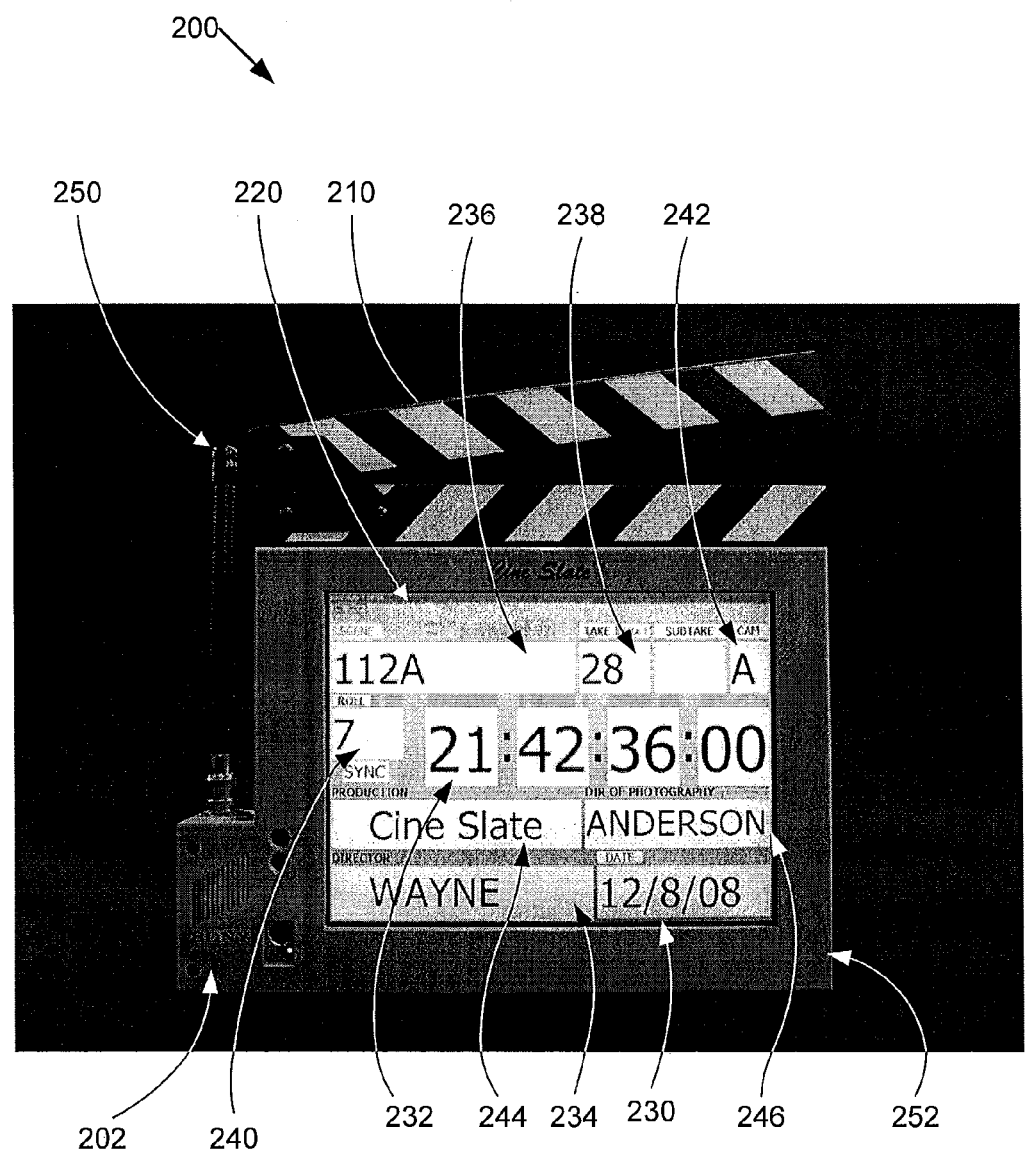
FIG. 2 shows one example of an enhanced slate configured to generate, present, and record production information about audio and video sequences during movie, video, or television production.
Figure 5:
FIG. 5 shows a storage device attached to the slate in the form of an SD memory card.

FIG. 2 shows one example of an enhanced slate 200 configured to generate, present, and record production information about audio and video sequences during movie, video, or television production. In the illustrated implementation of FIG. 2, the slate 200 includes a clapstick 210 and a display 220. As described above, the clapstick 210 is used to initiate a file writing process for writing production information, which is time-stamped with timecode. The display 220 shows production information such as date 230, timecode 232, director 234, scene 236, take 238, roll 240, camera number (or letter) 242, and other information 244, 246 related to movie, video, or television production. In the illustrated implementation of FIG. 2, the display 220 is configured as a touch-screen monitor and accepts information written thereon with a stylus. For example, the director's name ("Wayne") is written on the monitor using a stylus or on-screen "virtual" keyboard. The name can be displayed using character recognition software. The display 220 automatically records input information tagged with timing information to create metadata files. These metadata files can then be transferred (e.g., by memory card or wirelessly, see FIG. 5 showing a removable SD memory card) to a computer and then associated with the corresponding recorded audio and/or video data (e.g., using timecode). Antenna 250 enables wireless reception of master timecode. Other antennas (e.g., Bluetooth and wireless LAN antennas 252 in the slate) can enable communication to download or upload data. The slate 200 also includes computer functionality (processing, storage, input/output) to provide easier presentation and recording of a variety of information during movie, video, or television production.

Referring back to FIG. 1, the tagged production information is recorded, at box 140, and is associated with corresponding recorded data of the audio and video sequences (e.g., recorded by a camera event logger), at box 150. The association of the tagged production information with corresponding recorded data of the audio and video sequences occurs in a post-production processing station. In an additional optional implementation, the tagged production information is reviewed and/or edited. In one implementation, the associated production information is attached to the recorded data of the audio and video sequences as metadata. For example, the metadata can be incorporated into the recorded video data at a particular point in production time (timecode) referred to by the timing information. The metadata can be incorporated as additional data (to the recorded video data) or inserted into the recorded video data as a watermark. In another implementation, the generated production information is associated with the recorded data of the audio and video sequences after the acquisition of picture and sound is finished. That is, the generated production information can be stored and later associated with the recorded data using the timing information.

In an additional implementation, the process 100 includes a feature to provide list management of the slate. This feature is referred to as a "camera report," and it substantially reduces the need for a paper log. The report is a sortable database that is viewable and editable through an alternate screen on the slate.

Figure 3:
FIG. 3 shows another example of an enhanced slate configured to show the display configuration when the slate has captured a log event triggered by the closing of the clapstick.

In generating and presenting the production information, several different techniques can be used. For example, the enhanced slate 200 can include a position sensor 202 to record a tail flag when the slate is held upside down to indicate the tail slate. Traditionally, when a slate is held upside down, the display is shown upside down. However, in some implementations of the present invention, the enhanced slate 200 keeps the display right side up when the position sensor 202 senses that the slate 200 is being held upside down but records a machine-readable tail flag. The inverted visual position of the slate or the tail flag alerts post production processing stations to "backtime" code from the end of the take since the slate information is recorded with respect to the end of the shot rather than the beginning. In another example, the recording technique includes a "silent bloop" provision to insert a MOS ("without sound") flag and mark the timecode start of a scene in a slate log, wherein the flag alerts post production processing stations that no sound is to be expected for a particular scene and take, and the timecode marks the start of the scene. In some implementations, tail stick and MOS functions are integrated to work together. In another example, the clapping action of the clapstick changes the display of the timecode 310 (see FIG. 3) into inverse colors.

Referring again to FIG. 2, the display 200 can be divided into three sections: a primary display section, a second display section, and a write-on area. The primary display section includes the display for the timecode 232. The primary display section supports Society of Motion Picture and Television Engineers (SMPTE)/European Broadcasting Union (EBU) timecode which is a set of cooperating standards to label individual frames of video or film. The timecode can be generated from an internal generator or received from a wireless receiver. When in a wireless mode, the internal generator can be continuously jammed to provide the system with increased immunity from short term RF disturbances. The timecode can be displayed in a standard HH:MM:SS:F.F display format, with typical frame rates at 23.98, 24, 25, 29.97, or 30 frames per second. Drop and non-drop frame forms of timecode are supported. In one example implementation, the timecode display is frozen for a fixed number of frames (e.g., 3) after the clap, and then changes to user bits for a fixed amount of time (e.g., one second).

The secondary display section includes the display for showing scene 236, take 238, and sub-clip 248 in the following format. In one implementation, the scene 236 uses following nomenclature, PP123SSS, wherein P indicates a prefix and S indicates suffix. The prefix designates additional scenes. No prefix indicates that the scene is an original scripted scene. The suffix designates coverage shots for the scene. In one example implementation, the suffix can range from A to Z for the first 24 sub-scenes, AA to ZZ for the next 24 sub-scene, and AAA to ZZZ for the last 24 sub-scenes. In another implementation, the scene 236 is displayed as any combination of alpha-numeric characters up to a practical limit dictated by the size of the display window. The sub-clip or sub-take 248 is a feature that allows the camera assistant to manually mark re-starts ("do overs" or "pickups") as required. The sub-take marking action typically occurs off-camera, and creates a time stamp on the slate log and/or removable media. The displayed digits are primarily for operator verification. The slate 200 can include a user-defined switch which will typically be used for sub-clip entry. However, this switch can be changed to accommodate a more frequently used function such as MOS. The secondary display section can also include other displays including camera number 242 and roll 240. In an alternative implementation, the display is configured based upon E-Ink™ readers/displays.

The write-on area provides a space for an entry of the names of production 244, director 234, and director of photography 246. A handwriting recognition program can convert the input to legible block characters.

Figure 4:
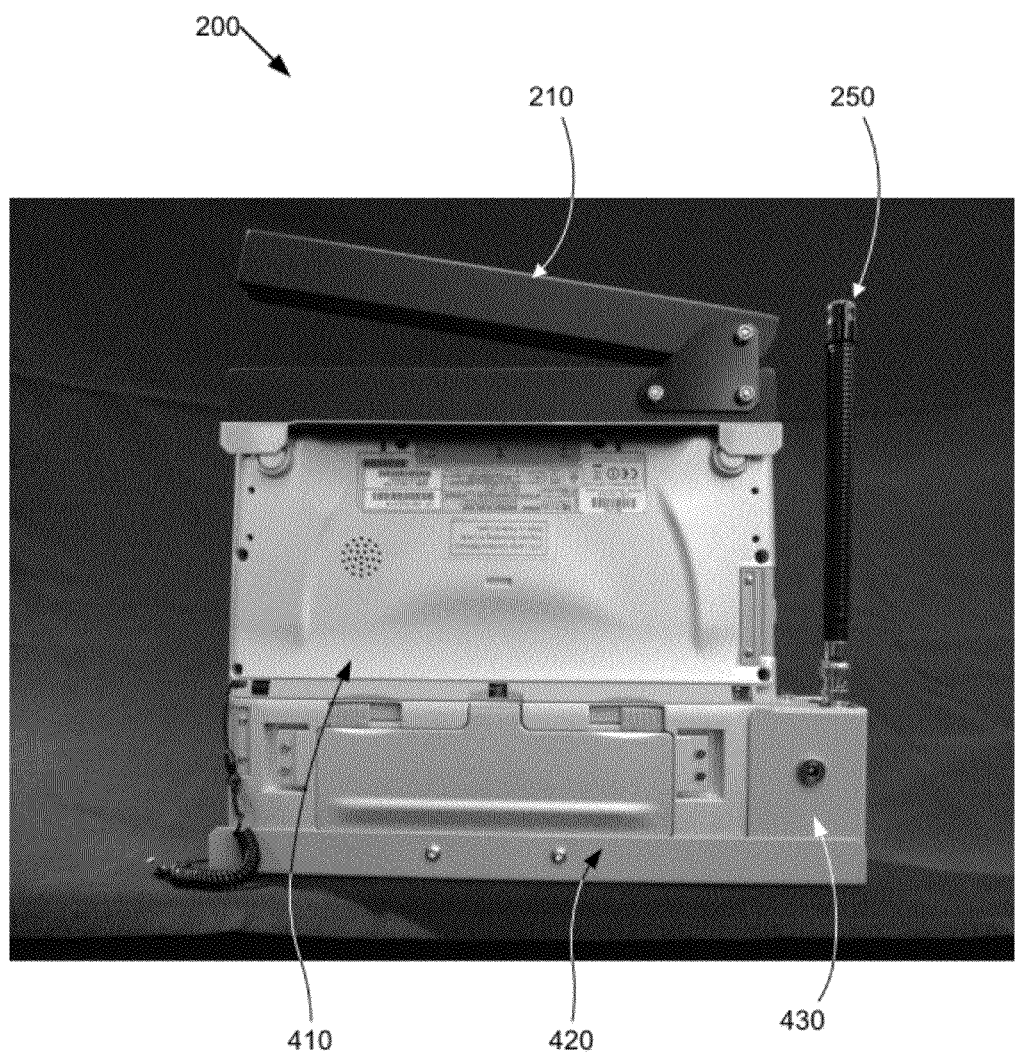
FIG. 4 shows a rear view of the enhanced slate in accordance with one implementation of the present invention.
Figure 6:
FIG. 6 shows a front view of the enclosure without the electronics.
Figure 7:
FIG. 7 shows a rear view of the enclosure without the electronics.

FIG. 4 shows a rear view of the enhanced slate 200 in accordance with one implementation of the present invention. This view provides a clear indication of how a standard tablet computer can be configured as a slate. Thus, in the illustrated implementation of FIG. 4, a tablet computer 200 is inserted into an enclosure 420, and is electrically attached to an electronic clapstick 210, a logger 430, and an antenna 250. The tablet computer 200 can be ruggedized and mechanically modified to enhance durability. FIG. 6 and FIG. 7 show front and rear views of the enclosure 420 without the electronics. In an alternative implementation, the above concept is implemented as a dedicated, purpose built hardware device rather than using a standard tablet computer housed in an enclosure. In this form, it would be a processor-driven unit with an operator interface including switch inputs and LED display devices.

Additional variations and implementations are also possible. For example, a "sound rolls only" configuration allows metadata from the sound recorder to provide naming information in the post-production process. In another example, a "multiple camera shoots" configuration allows the cameras to be pre-slated (i.e., sound does not roll) for visual identification. In this configuration, camera metadata on the master media and captured by a camera event logger indicates camera ID (e.g., A, B, C, etc.). Timecode slate is configured to indicate "multiple" and clapped in normal manner. The post production process assigns slate data and sound across multiple camera files. The file names may be derived from camera ID, roll, and scene and take timecode stamp. Other options can include using "separate clapsticks" (i.e., one clap action per camera while all or some cameras are rolling). In yet another example, "More than one production (shooting) unit" configuration addresses ambiguity resulting from multiple instances of date and timecode, and tries to avoid the ambiguity in the post production process.

Figure 8:
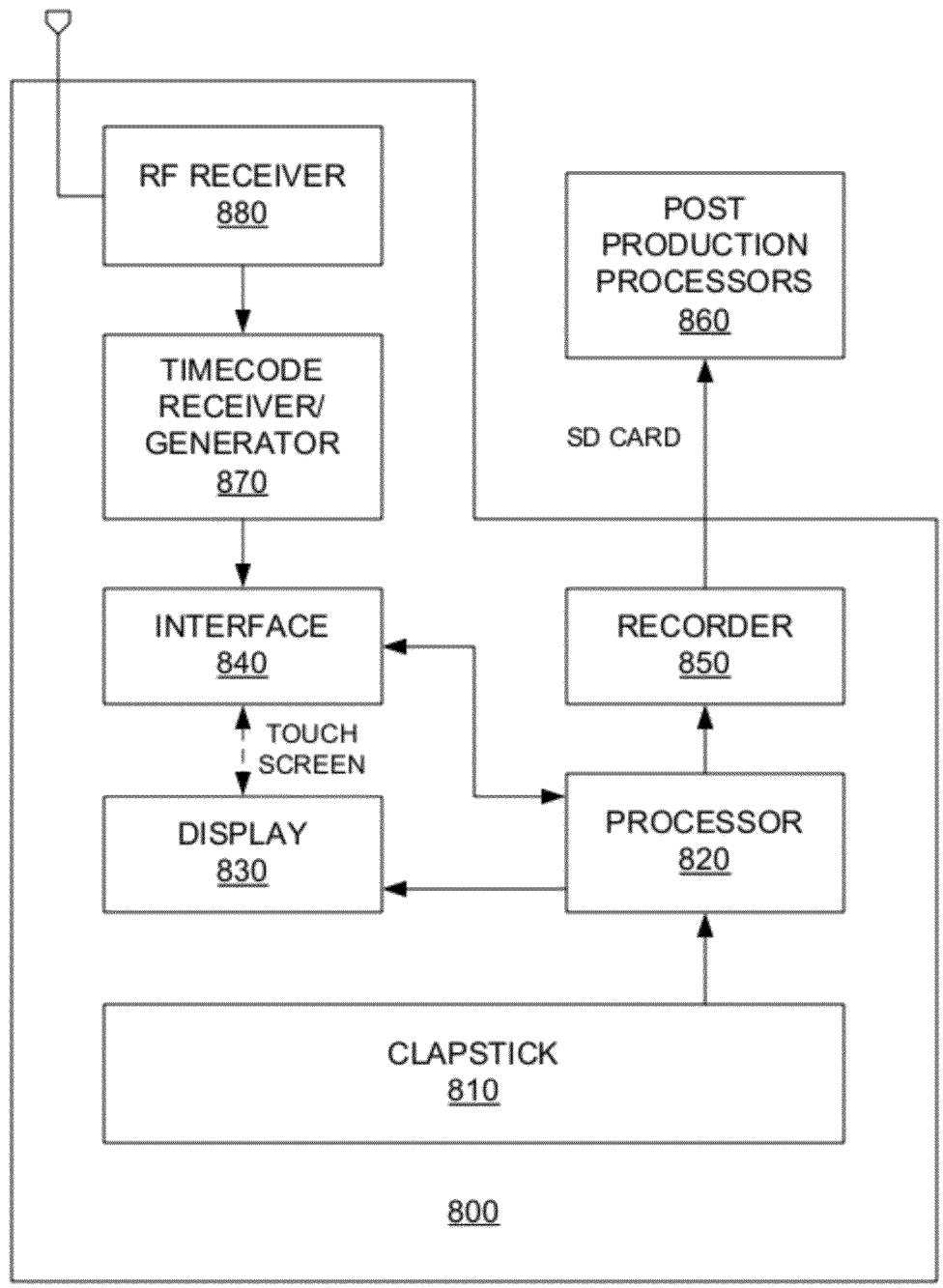
FIG. 8 shows a block diagram of an enhanced slate in accordance with one implementation of the present invention.

FIG. 8 shows a block diagram of an enhanced slate 800 in accordance with one implementation of the present invention. In the illustrated implementation of FIG. 8, the slate 800 includes a clapstick 810, a processor 820, a display 830, an interface 840, a recorder 850, a timecode receiver/generator 870, and an RF receiver 880. Timing information originates from a transmitter (not shown) and is received by the RF receiver 880. The received timing information updates the receiver/generator 870. The interface 840 is configured to communicate with the timecode receiver/generator 870, and the recorder 850 transmits recorded production data to at least one post-production processing station 860. The processor 820 is configured to receive and tag production information about at least one of audio and video sequences, wherein the production information is tagged with timing information obtained from the timecode generator 870. The display 830 is configured to display the production information. The recorder 850 is configured to record and associate the information with corresponding recorded data of the audio and video sequences. The clapstick 810 is coupled to the processor 820, and is used to initiate the recording.

In an additional implementation, all slate data associated with a given event (e.g. everything captured when the clapsticks are clapped) is converted to a machine readable representation for display on the screen when auxiliary metadata, timecode and audio channels are not available on the camera. For example, the main screen of the slate showing the scene, take, and director's name shifts to briefly display the information in a barcode format. The machine readable representation of the slate data is then visually captured by the camera, and is subsequently extracted and decoded in the post production. This implementation applies primarily to film-based capture but the technique can also be used redundantly with video capture.

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM/DVD drives, flash memory cards, and magnetic tape drives), one or more input devices (e.g., game controllers, touch screens, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. For example, although the above descriptions generally provide for computer-generated logs, the enhanced slate can still provide traditional functionalities of an audible clap with visuals of the clapsticks closing to provide fail-safe feature in case all of the computer-generated logs are corrupted or lost. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method for movie, video, or television production, the method comprising:
   generating production information about recorded data of one of: (1) audio sequence; (2) video sequence; and (3) audio and video sequences;
   tagging the generated production information with timing information;
   displaying the generated production information on a display;
   recording the tagged production information,
   wherein a clapstick of a slate is used to initiate the recording automatically; and
   associating the tagged production information with corresponding recorded data.

2. The method of claim 1, wherein the associated production information is attached to the corresponding recorded data as metadata.

3. The method of claim 2, wherein the metadata is incorporated into the corresponding recorded data at a particular point in production time referred to by the timing information.

4. The method of claim 2, wherein the metadata is incorporated as additional data to the corresponding recorded data.

5. The method of claim 2, wherein the metadata is inserted into the corresponding recorded data as a watermark.

6. The method of claim 1, wherein the generated production information is associated with the corresponding recorded data after the movie, video, or television acquisition of picture and sound is finished.

7. The method of claim 1, further comprising
   using readings from a position sensor to record a tail flag when the slate is held upside down to indicate that the production information is recorded with respect to an end of a shot.

8. The method of claim 7, wherein the timing information is displayed in inverse color when the clapstick is clapped to initiate the recording.

9. The method of claim 1, further comprising
   inserting a MOS flag in a slate log to indicate to post production processing stations that no sound is to be expected for the particular scene and take.

10. The method of claim 1, wherein the tagged production information is associated with corresponding recorded data in a post-production process.

11. The method of claim 10, further comprising
    allowing metadata from a sound recorder to provide naming information in the post-production process.

12. The method of claim 1, further comprising
    allowing cameras to be pre-slated for visual identification.

13. A slate for movie, video, or television production, the slate comprising:
    an interface configured to communicate with a timecode generator and at least one post-production processing station;
    a processor configured to receive and tag production information about recorded data of one of: (1) audio sequence; (2) video sequence; and (3) audio and video sequences,
    wherein the production information is tagged with timing information obtained from the timecode generator;
    a display configured to display the production information;
    a clapstick coupled to the processor; and
    a recorder configured to record and associate the tagged production information with the corresponding recorded data,
    wherein the clapstick is used to initiate the recording.

14. The slate of claim 13, further comprising
    a position sensor to record a tail flag when the slate is held upside down to indicate that the production information is recorded with respect to an end of a shot.

15. The slate of claim 14, wherein the display displays the timing information in inverse color when the clapstick is clapped to initiate the recording.

16. A non-transitory computer-readable storage medium storing a computer file for movie, video, or television production, the computer file comprising executable XML instructions that cause a computer to:
    generate production information about recorded data of one of: (1) audio sequence; (2) video sequence; and (3) audio and video sequences;
    tag the generated production information with timing information;
    display the generated production information on a display;
    record the tagged production information,
    wherein a clapstick of a slate is used to initiate the recording; and
    associate the tagged production information with the corresponding recorded data.

17. The storage medium of claim 16, wherein the associated production information is attached to the recorded data as metadata.

18. The storage medium of claim 17, wherein the metadata is incorporated into the recorded data at a particular point in production time referred to by the timing information.

19. The storage medium of claim 17, wherein the metadata is incorporated as additional data to the recorded data.

20. The storage medium of claim 17, wherein the metadata is inserted into the recorded data as a watermark.

21. The storage medium of claim 16, wherein the generated production information is associated with the recorded data after the movie, video, or television acquisition of picture and sound is finished.

* * * * *